US 8,356,148 B2

(12) United States Patent
Popovski et al.

(10) Patent No.: US 8,356,148 B2
(45) Date of Patent: Jan. 15, 2013

(54) SNAPSHOT METADATA MANAGEMENT IN A STORAGE SYSTEM

(75) Inventors: Vladimir Popovski, Irvine, CA (US); Nelson Nahum, Tustin, CA (US); Alexander Lyakas, Haifa (IL); Ishai Nadler, Kfar Saba (IL); Moshe Melnikov, P.O.B. (IL)

(73) Assignee: LSI Corporation, Milpitas, CA (US)

( * ) Notice: Subject to any disclaimer, the term of this patent is extended or adjusted under 35 U.S.C. 154(b) by 640 days.

(21) Appl. No.: 12/564,291

(22) Filed: Sep. 22, 2009

(65) Prior Publication Data

US 2011/0072224 A1    Mar. 24, 2011

(51) Int. Cl.
*G06F 12/00* (2006.01)

(52) U.S. Cl. .............. 711/162; 711/170; 711/E12.001; 711/E12.103; 707/639; 707/649

(58) Field of Classification Search .................. 711/162, 711/170, 165, E12.001, E12.103; 707/639, 707/649
See application file for complete search history.

(56) References Cited

U.S. PATENT DOCUMENTS

2009/0327631 A1* 12/2009 Yamada et al. ............... 711/162

* cited by examiner

*Primary Examiner* — Jasmine Song
(74) *Attorney, Agent, or Firm* — Duft Bornsen & Fishman LLP (57) ABSTRACT

Methods and systems for improving performance in a storage system utilizing snapshots are disclosed by using metadata management of snapshot data. Specifically, various metadata structures associated with snapshots are utilized to reduce the number of IO operations required to locate data within any specific snapshot. The number of IO operations are reduced by allowing the various metadata structures associated with the temporally current snapshot to locate data directly within any temporally earlier snapshot or on the original root volume.

20 Claims, 7 Drawing Sheets

SNAPSHOT METADATA MANAGEMENT IN A STORAGE SYSTEM

BACKGROUND

1. Field of the Invention

The invention relates generally to managing snapshots in a storage system and more specifically relates to managing metadata associated with snapshots for logical volumes to improve performance of storage systems.

2. Discussion of Related Art

Storage systems typically include one or more storage controllers, each coupled with one or more storage devices operating to persistently store data. The storage controllers are generally responsible for receiving and processing Input/Output (IO) requests from one or more attached host systems requesting the reading or writing of information to the storage system. Additionally, the storage controllers may process additional IO requests, such as requests for managing internal data associated with storage devices, calculating redundancy information for data on storage devices, performing rebuild operations on redundant volumes on the storage devices, and the like. Typical storage devices may include any number of apparatus for persistent data storage, such as hard disks, flash based drives, optical based storage devices, non-volatile memory systems, and other such apparatus operable to persistently store data.

Typically, a host system attached to the storage system accesses data persistently stored on the storage devices using one or more logical volumes mapped to the storage devices by the storage controllers. Mapping logical volumes to storage devices allows a host to access the logical volume irrespective of an actual physical mapping to any specific storage devices. For example, a host system may access a logical volume as a linear sequence of block addresses. When a storage controller receives IO requests from the host system, the IO requests are mapped to physical storage in a number of configurations, such as stripes of data on specific storage devices. This type of IO mapping by the storage controller allows a wide variety of redundancy and/or performance enhancing configurations for the logical volume which are often performed transparently to the host system.

As a host reads and writes data to a logical volume, various options exist in allowing a host system to capture the state of the data within the logical volume at various points in time. Because a logical volume does not specifically map to physical storage in the storage system, the storage system is free to perform various activities on data read from, or written to, a logical volume to allow the host to access earlier versions of data at some future point in time. For example, a host system may wish to capture a previous state of the logical volume before installing patches to an operating system running on the logical volume. In essence, previous states of data on the logical volume may be captured and made available at some later time.

One such brute force method of capturing the previous state of the logical volume would be for the storage system to allocate enough storage space on the storage devices to perform a complete copy of the logical volume onto the newly allocated space. This is typically inefficient because only a small portion of data on the logical volume may change from one point of capture to another. Additionally, as typical logical volumes may exceed many hundreds of gigabytes in size, all available physical storage would be quickly allocated for such activities.

A more elegant solution currently in practice is to create a sequence of snapshots of the logical volume. Typically, a snapshot includes a temporary volume of storage allocated by the storage system on the storage devices, and additionally includes an IO mapping table, or a relocation table, which indicates how data is stored on various portions of the temporary volume. When a snapshot is created by the storage system, subsequent changes to the logical volume are stored on the various portions of the temporary volume. Thus, as each snapshot is created, any additional changes to the logical volume are recorded within the relocation tables and temporary volumes of each individual snapshot, thus preserving the state of earlier snapshots and even the original root volume of the logical volume (i.e., a root volume is the base logical volume before any snapshots are applied to it).

The use of relocation tables in snapshots is useful in allowing the storage of only the changed data in a logical volume until a new snapshot is created. For example, if a snapshot is created and subsequently a host issues a write IO request for address block twenty of the logical volume, the storage system may store the data on the current temporary volume of the current snapshot. In this case, the storage system would update the relocation table associated with the current snapshot to indicate that address block twenty is currently being read from or written to a specific portion of the temporary volume of the current snapshot. In some cases a snapshot may be "thinly provisioned." In this case, a snapshot may be initially allocated some small portion of space (e.g., 200 megabytes) of physical storage. After the initial allocation of space, storage may be expanded as necessary to include any new data written to the snapshot.

While snapshots may be used to capture changes to the logical volume, a view of a snapshot (and the corresponding root volume) is used to allow the creation of a new logical volume for read and write access of the data at the point when the view is created. For example, if a number of temporally sequential snapshots are created from a root volume, a user may wish to create a new logical volume associated with a particular snapshot and make subsequent changes without altering the original logical volume. Like branches on a tree, views allow a user to "branch off" the main sequence of snapshots for subsequent modification. Each view includes the underlying data, such as the sequence of snapshots and the original root volume. A view, however, is different than a typical snapshot as it allows the user to create a virtual volume for presentation of the underlying data for read and write access. Along the "branch", the view is independent from the original sequence of snapshots.

Problems may arise when large numbers of snapshots are created in a logical volume. As numerous snapshots are created, the storage system may have to search various relocation tables for the specific data requested. For example, address block twenty of the logical volume may reside on snapshot fifty, while the current snapshot of the logical volume may be snapshot two hundred. In the case where address block twenty did not change from snapshot fifty one to snapshot two hundred, an IO read request for address block twenty of the logical volume would actually be read from the temporary volume associated with snapshot fifty. Thus, when the storage system receives an IO read request for address block twenty of the logical volume, it may have to read and process each relocation table in series from snapshot two hundred to snapshot fifty to locate the requested data. As relocation tables are often many megabytes in size, it would be impractical to store many thousands of snapshot relocation tables in a memory of the storage controller for fast processing. Instead, the relocation tables are typically stored along with the temporary volumes on physical storage. Thus, the reading of many hundreds or thousands of relocation tables from physical storage may impose a significant performance penalty to the storage system when performing IO requests for a logical volume which includes snapshots.

Thus it is an ongoing challenge to manage snapshot data in a logical volume to improve the performance of a storage system.

SUMMARY

The present invention solves the above and other problems, thereby advancing the state of the useful arts, by providing methods and systems for improving performance in a storage system utilizing snapshots by using metadata management of snapshot data. Specifically, various metadata structures associated with snapshots are utilized to reduce the number of IO operations required to locate data within any specific snapshot. The number of IO operations are reduced by allowing the various metadata structures associated with the current or newest snapshot to locate data directly within any earlier snapshot or on the original root volume.

In one aspect hereof, a method operable in a computing device associated with a storage system is provided for managing snapshots in a logical volume. Each snapshot includes a relocation table and a corresponding temporary volume, where the relocation table includes a relocation entry associated with a corresponding portion of storage on the temporary volume. According to the method, a first snapshot is generated of a logical volume. A relocation entry within a relocation table of the first snapshot is updated, where the relocation entry is associated with a portion of storage on a temporary volume of a second snapshot, and where the first snapshot is temporally newer than the second snapshot.

In another aspect hereof, an alternate method operable in a computing device associated with a storage system is provided for processing Input/Output (IO) requests for a logical volume, where the logical volume includes a plurality of temporally sequential snapshots. According to the method, an IO request for the logical volume is received. A first relocation entry in a relocation table of a first snapshot is identified based on the IO request, where the first relocation entry is associated with a portion of storage on a temporary volume of a second snapshot, and where the second snapshot is temporally older than the first snapshot. Additionally according to the method, the first relocation entry is processed to identify the corresponding portion of storage on the temporary volume of the second snapshot. A response to the IO request for the logical volume is performed by accessing the identified portion of storage on the temporary volume of the second snapshot.

In another aspect hereof, a computing device associated with a storage system is provided. The storage system includes a storage device, a plurality of temporally sequential snapshots, and a computing device. The storage device includes a logical volume. Each of the plurality of snapshots includes a temporary volume of storage and a relocation table. Each relocation table includes a relocation entry associated with a corresponding portion of storage on a temporary volume. The computing device is coupled with the storage device and is operable to receive IO requests for the logical volume. The computing device is further operable to process the IO request to identify a first relocation entry in a relocation table of a first snapshot. The first relocation entry is associated with a portion of storage on a temporary volume of a second snapshot. Additionally, the second snapshot is temporally older than the first snapshot. The computing device is further operable to process the first relocation entry to identify the corresponding portion of storage on the temporary volume of the second snapshot. Additionally, the computing device is further operable to respond to the IO request for the logical volume by accessing the identified portion of storage on the temporary volume associated with the second snapshot.

DETAILED DESCRIPTION OF THE DRAWINGS

Figure 1:
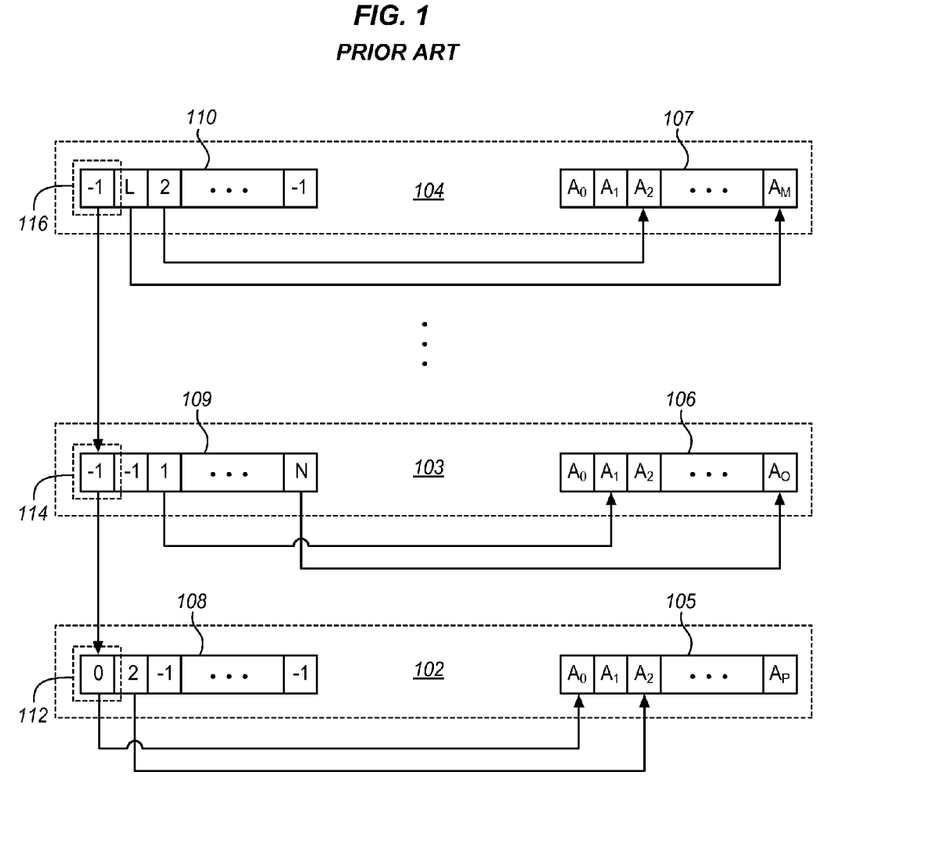
FIG. 1 is a block diagram illustrating a series of snapshots in the prior art.

FIG. 1 is a block diagram illustrating a series of snapshots 102-104 in the prior art. As discussed in the Background, snapshots allow a user of a storage system the opportunity to capture the state of the data on a logical volume for use at a later time. For example, a user may wish to create a snapshot of a logical volume containing an operating system before applying updates. By using snapshots, the user or the storage system is afforded the opportunity to roll back or recover a previous state of the data on the logical volume. Therefore, if problems arise during the updating process, an opportunity exists to return the logical volume to the previous state that the data existed in when the snapshot was created.

Snapshots 102-104 each contain associated temporary volumes 105-107 and relocation tables 108-110. Typically, snapshots are created in a temporal sequence. For example, snapshot 102 of FIG. 1 may be the earliest snapshot of a logical volume, and snapshot 104 may be the latest or newest snapshot of a logical volume. In FIG. 1, snapshot 102 contains temporary volume 105 and relocation table 108. In like manner, snapshots 103-104 contain temporary volumes 106 and 107 respectively, and relocation tables 109 and 110, respectively.

FIG. 1 is illustrative of how a series of snapshots may be interrelated in the prior art. When a snapshot of a logical volume is created, subsequent changes to the logical volume are stored in the snapshot. For example, snapshot 102 illustrates changed data to the logical volume written into portions $A_0$ and $A_2$ of temporary volume 105. Relocation table 108 of snapshot 102 illustrates how IO mapping may be used to map IO requests for block addresses of a logical volume to locate the changed data in snapshot 102. After snapshot 102 is created, a write request modifies block address twenty of the logical volume. Data for block address twenty is stored in portion $A_0$ of temporary volume 105 of snapshot 102. A relocation entry 112 is written to indicate where in temporary volume 105 the data resides. In this example, relocation entry 112 indicates that the data for block address twenty is at offset zero within temporary volume 105, or more specifically, at portion $A_0$ of temporary volume 105. In like manner, other entries in relocation table 108 map changes to data within a logical volume to temporary volume 105. Thus, after snapshot 102 is created in the prior art, subsequent changes to a logical volume are stored within temporary volume 105 and relocation entries within relocation table 108 map the changes to temporary volume 105.

After snapshot 103 is created, subsequent changes to data within the logical volume are now stored in temporary volume 106 of snapshot 103. Thus, changes written into snapshot 102, which is earlier than snapshot 103, are effectively frozen for use at some subsequent point in time. For example, now that snapshot 103 is the current snapshot for the logical volume, changes to block address twenty would be written to temporary volume 106. Thus, if a user wished to restore the logical volume to a previous state, data stored in portion $A_0$ within the earlier snapshot 102 may be used to do so. Snapshot 103 is additionally indicative of how subsequent snapshots operate in the prior art when previously changed data in an early snapshot does not change. For example, when snapshot 103 is created after snapshot 102, data written to portion A0 of temporary volume 105 in the previous example (e.g., writing to block address twenty) is made available to read IO requests for the logical volume even though the data may reside on a much older snapshot.

Referring again to FIG. 1, consider the example whereby snapshot 103 is the current snapshot (i.e., snapshot 104 has not been created as of yet). A read request for address block twenty maps to relocation entry 114 of snapshot 103. Because the originally changed data for address block twenty resides on a temporally earlier snapshot (i.e., snapshot 102), relocation entry 114 contains some initialized value (e.g., −1). Thus, a computing device processing relocation entry 114 recognizes that data for address block twenty does not reside within the current snapshot 103. Instead, the computing device processes each temporally earlier snapshot to determine the location of the data for the request. After reading relocation entry 114 of snapshot 103, a computing device would read relocation entry 112 from the earlier snapshot 102.

In many cases, it may be desirable to generate a large number of snapshots of a logical volume. For example, a computing device may generate hundreds or even thousands of snapshots per hour. In this case, situations may arise whereby hundreds or even thousands of relocation tables may be read to identify the correct snapshot containing some desired data. When snapshot 104 of FIG. 1 is generated, any previous data written in snapshots 102-103 are captured or frozen for later use. Thus, as in the example discussed previously, an IO request for the logical volume for address block twenty may result in the computing device first reading relocation entry 116 of snapshot 104, then relocation entry 114 of snapshot 103, and finally relocation entry 112 of snapshot 102 to identify portion $A_0$ within snapshot 102. Consequently, many relocation tables may be read and processed to identify where data resides when many snapshots are generated. Because the relocation tables are typically some megabytes in size, they would generally reside on physical storage. For example, both temporary volume 105 and relocation table 108 of snapshot 102 may be written persistently to one or more storage devices. Generally, when trying to locate data within a snapshot, a large number of slow IO requests may be generated before locating the data requested. This type of IO activity results in poor performance of computing devices utilizing a high snapshot generation rate and the types of prior art snapshot structures utilized in FIG. 1.

Methods and systems disclosed in accordance with features and aspects herein, provide for an improvement in computing devices associated with storage system performance by, in part, utilizing snapshot structures which allow current top level snapshot relocation tables to map IO requests for data within earlier snapshots directly, without processing each snapshot in a sequential manner as described in the prior art of FIG. 1. Additionally, metadata is derived from snapshot relocation tables and held in memory for fast processing when a current top level snapshot relocation table does not contain location information for data contained within an earlier snapshot.

Figure 2A:
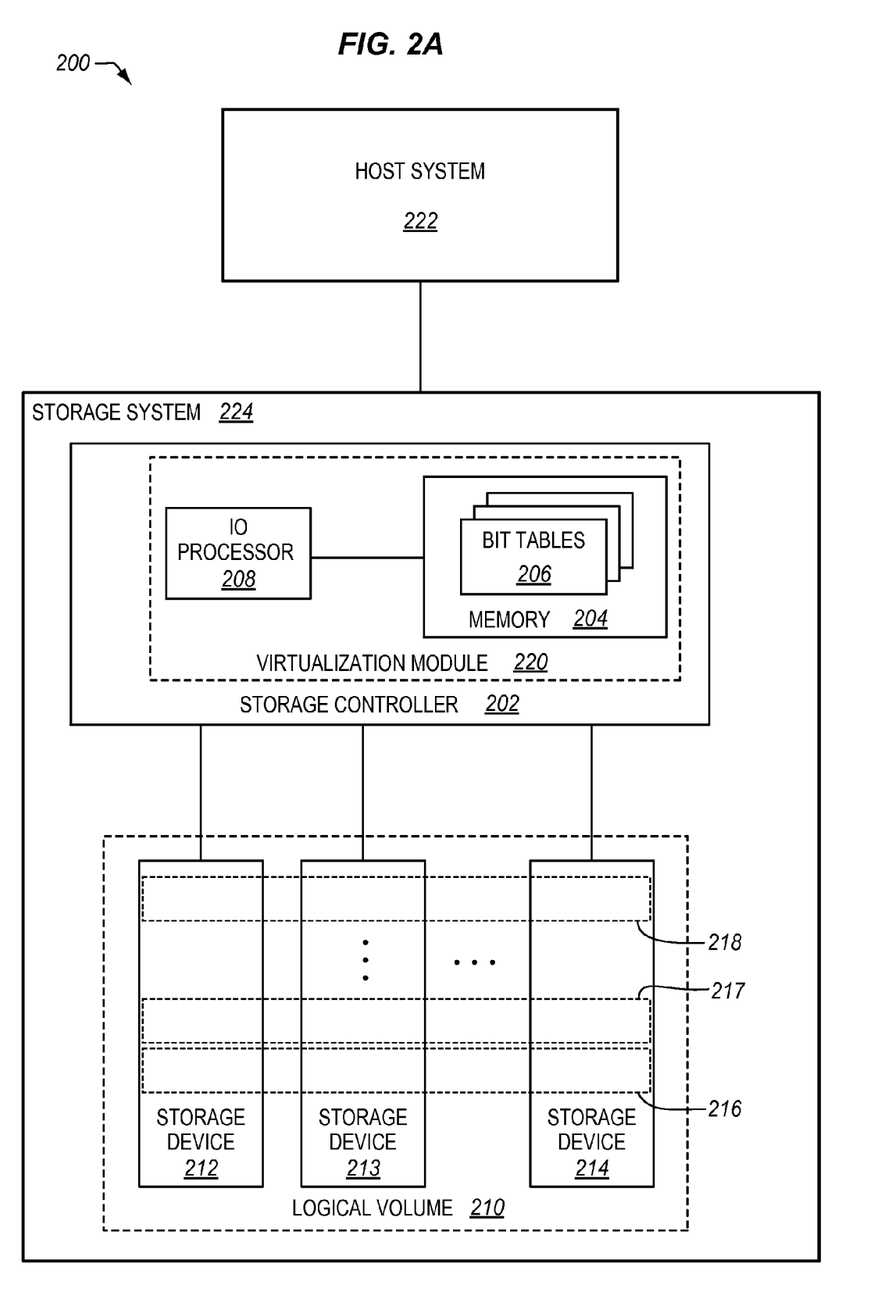
FIGS. 2a-2c are block diagrams illustrating exemplary systems operable to reduce the IO operations when locating data within snapshots in accordance with features and aspects disclosed herein.
Figure 2B:
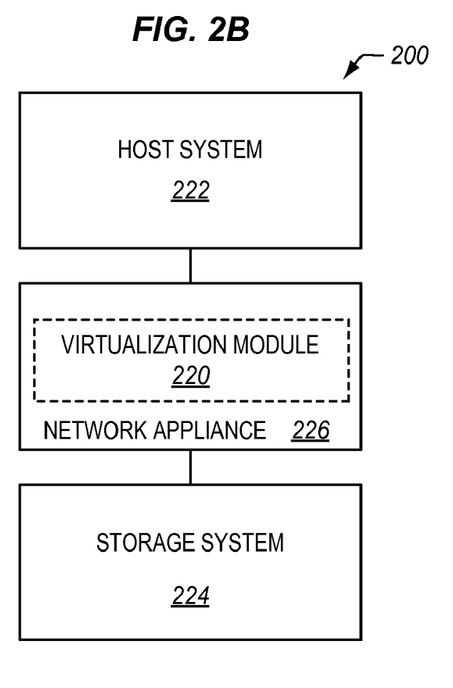
Figure 2C:
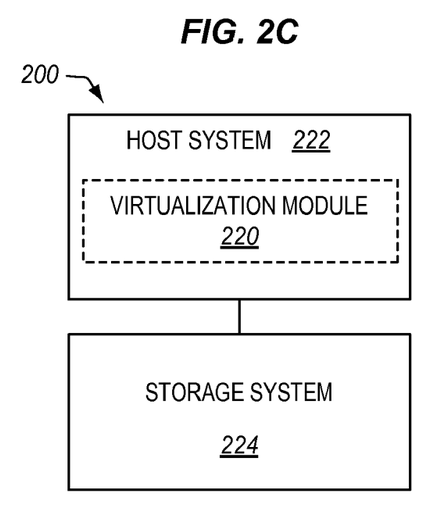

FIGS. 2A-2C are block diagrams illustrating exemplary systems operable to reduce the IO operations when locating data within snapshots in accordance with features and aspects disclosed herein. In FIG. 2a, system 200 includes a storage controller 202 and one or more storage devices 212-214 coupled with storage controller 202. One skilled in the art will recognize that FIGS. 2A-2C are illustrative in nature, and that specific blocks or modules depicted in system 200 may be grouped in fewer or more exemplary ways as a matter of design choice. Additionally, one skilled in the art will recognize that any specific blocks detailed within system 200 may comprise any number of circuits, processors, memory systems (both persistent and volatile), programmable devices, hard disks, flash based persistent storage, battery backed up random access memory (RAM), or any other system or apparatus operable to perform the functionality recited herein with respect to FIGS. 2A-2C.

Storage controller 202 includes a virtualization module 220 including an IO processor 208 and a memory 204 coupled with IO processor 208. A logical volume 210 resides on storage devices 212-214. Logical volume 210 includes a root volume 216 and a plurality of snapshots 217-218. One skilled in the art will recognize that logical volume 210 may be mapped to physical storage in a storage system in any number of ways, including various redundancy configurations. Additionally, one skilled in the art will recognize that root volume 216 and snapshots 217-218 may be mapped to physical storage (i.e., one or more storage devices 212-214) in different ways as a matter of design choice.

Storage controller 202 is operable to receive Input/Output (IO) requests for logical volume 210 from a host system 222. The IO requests may include a request for writing data to logical volume 210, a request to read data from logical volume 210, or other internal requests related to the operation of logical volume 210. In some cases, the IO requests may originate from host system 222 coupled with storage system 224. For example, a user on a client computer coupled with storage system 224 may utilize IO requests to persistently store data within logical volume 210. Such a user may, for example, wish to periodically create snapshots of logical volume 210 for backup and/or restoration purposes of earlier snapshots. Additionally, system 200 may generate snapshots of logical volume 210 based on some fixed or variable schedule, or responsive to some event.

FIG. 2B illustrates another embodiment of system 200. In FIG. 2B, virtualization module 220 operates within a network appliance 226. Virtualization module 220 in FIG. 2B operates in a similar manner as in virtualization module 220 in FIG. 2A. In FIG. 2B, network appliance 226 operates between host system 222 and storage system 224. Virtualization module 222 in network appliance 226 may include various hardware and software embodiments which operate similar to those described hereinafter for IO processor 208, memory 204, and bit tables 208 of FIG. 2A. In FIG. 2C, virtualization module 220 operates within host system 222. Virtualization module 220 may comprise various software modules which operate similar to those described for virtualization module 220 of FIGS. 2A and 2B. The functionality of virtualization module 220 will be described hereinafter using FIGS. 3-4.

Figure 3:
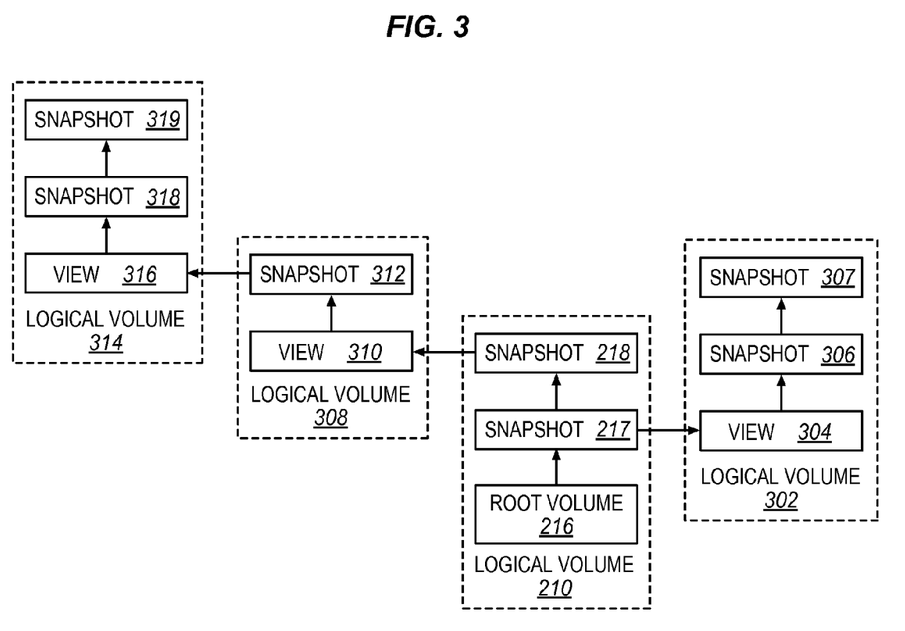
FIG. 3 is a block diagram illustrating a variety of exemplary snapshot and view configurations in accordance with features and aspects disclosed herein.

FIG. 3 is a block diagram illustrating a variety of exemplary snapshot and view configurations in accordance with features and aspects disclosed herein. System 200 illustrated in FIGS. 2A-2C operate to generate a variety of snapshot and view configurations. For example, logical volume 210 includes a root volume 216 and snapshots 217-218. A view is a modifiable set of snapshots and/or root volume combinations which are accessible as a new logical volume. Logical volume 302 includes view 304, which is generated from snapshot 217 of logical volume 210. In this case, view 304 would be a modifiable logical volume including root volume 216 and snapshot 217 of logical volume 210. Views allow various independent branches of the original logical volume 210 to be created and modified, without altering the original logical volume 210. For example, a user may wish to create view 304 within logical volume 302 for testing purposes. Perhaps snapshot 217 of logical volume 210 contained an intermediate build of software which required testing. By creating view 302 and logical volume 302, a user can perform testing on the intermediate software build without interfering with the operation of the original logical volume 210. When reading data from logical volume 302, the data may be contained within any current snapshot, previous snapshot, or the root volume 216 that is part of the chain of snapshots between root volume 216 and the current snapshot 307. Thus, when reading data from logical volume 302, the data may be contained within any of the snapshots 307 or 306, within view 304, or within root volume 216. As FIG. 3 illustrates, additional snapshots (e.g., 218) and views (e.g., 310 and 316) may be generated from the original logical volume 210 without interference from each other or logical volume 210. FIG. 3 additionally illustrates how snapshots 306-307 can be generated from view 304. In like manner, snapshots 312, 318 and 319 may be generated from views 310 and 316, respectively. System 200 illustrated in FIGS. 2A-2C are operable to generate any number of combinations of views and snapshots, including those illustrated in FIG. 3.

Figure 4:
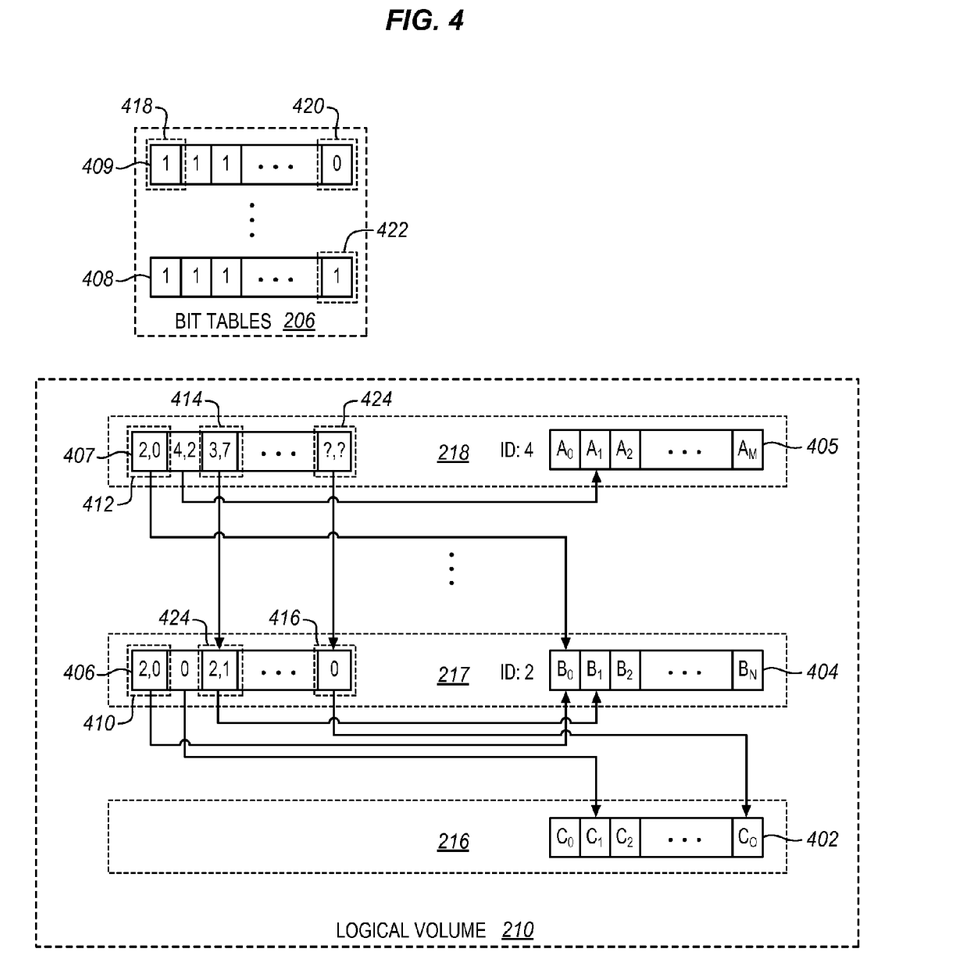
FIG. 4 is a block diagram illustrating an exemplary series of snapshots and bit tables in accordance with features and aspects disclosed herein.

FIG. 4 is a block diagram illustrating an exemplary series of snapshots 217-218 and bit tables 206 in accordance with features and aspects disclosed herein. FIG. 4 further illustrates in detail how system 200 utilizes exemplary snapshots 217-218 for improving the performance of system 200. Logical volume 210 illustrated in FIG. 4 includes root volume 216. Root volume 216 includes storage 402 which details various portions of storage $C_0$-$C_N$ for root volume 216. When logical volume 210 is first created within storage system 224, root volume 216 may be mapped to storage devices 212-214 in a number of ways as a matter of design choice. For example, root volume 216 may reside redundantly or non-redundantly on storage devices 212-214. After logical volume 210 is created, but before any snapshots are generated, IO requests processed by storage controller 202 are written to root volume 216. For example, a write request for block address twenty may be generated by a host system and written persistently to portion $C_0$ of root volume 216. In like manner, portions $C_1$-$C_N$ may be utilized for persistent storage of data before any snapshots are created for logical volume 210. At some point in time a user, or system 200 itself, may generate snapshot 217. Snapshot 217 includes a temporary volume 404 and a relocation table 406. Additionally, an identification number (ID) may be assigned to snapshot 217 (e.g., ID: 2). Identification numbers are used to identify specific snapshots within relocation entries of relocation tables, and will be described further in the following discussions. Similarly to root volume 216, temporary volumes may be stored persistently on one or more storage devices 212-214 in a variety of redundant or non-redundant configurations.

Relocation entries disclosed herein utilize ID information assigned to a snapshot to determine which snapshot contains the temporary volume which the requested data resides upon. For example, relocation entry 410 of snapshot 217 has an example value of (2,0). In this example, 2 indicates a snapshot ID of 2 (i.e., snapshot 217) contains the temporary volume containing the desired data. Additionally in this example, 0 indicates an offset from the beginning of the temporary volume (i.e., temporary volume 404) identifying the portion of storage containing the data. Thus, the example value (2,0) in relocation entry 410 of relocation table 406 indicates that the data is contained on snapshot 217 (i.e., ID 2) at offset 0 (i.e., portion $B_0$) of temporary volume 404. Relocation tables may contain entries which identify that specific data exists on storage 402 of root volume 216. One example utilizing this concept within snapshot 217 is relocation entries which indicate zero. In those cases, IO processing to locate data would access portion of storage 402 of root volume 216 (e.g., portions C1 and CN).

Other types of relocation information may reside within entries of a relocation table. For example, a predefined value may indicate an initialized entry, or more specifically, that an entry does not map to persistent storage. This may occur when a relocation table is first generated along with a temporary volume within a snapshot. One example of this is entry value (?,?) in relocation table 407. In this example, (?,?) indicates that this entry does not map to a portion of storage on either a temporary volume or a root volume. Instead, storage controller 202 of virtualization module 220 may read an earlier snapshot relocation table (e.g., relocation table 406 of snapshot 217) to identify the portion of storage containing the data. In accordance with features and aspects herein, relocation entries may correspond to portions of storage within snapshots different than that which contain the relocation tables. For example, relocation entry 412 of snapshot 218 has a value of (2,0), indicating that data for this entry resides on snapshot ID 2 at an offset of 0. Relocation table 407 resides within snapshot 218 while relocation entry 412 corresponds to portion of storage $B_0$ within snapshot 217. An additional type of relocation entry is illustrated in relocation entry 414. Relocation entry 414 has an example value of (3,7), indicating an ID of a snapshot not shown in FIG. 4. In this illustration, snapshot ID 3 has been deleted. In this case, storage controller 202 of virtualization module 220 may read the relocation table of a temporally earlier snapshot (e.g., ID 2 or snapshot 217) to identify the portion of storage. One skilled in the art will recognize that a variety of relocation entry types, mappings, and/or configurations may exist as a matter of design choice.

As discussed briefly with regard to FIG. 2A, storage controller 202 is operable to receive IO requests for logical volume 210. Responsive to receiving the request, storage controller 202 of virtualization module 220 is further operable to process the IO request to identify relocation entries in relocation tables of a snapshot. For example, storage controller 202 may receive a read IO request for block address twenty for logical volume 210. In this example, we will consider that a plurality of snapshots exists within logical volume 210 (i.e., snapshots 217-218). After receiving the IO request for reading block address twenty, storage controller 202 of virtualization module 220 may identify a relocation entry 412 of snapshot 218. Relocation entry 412 may be identified by processing the IO request in a number of ways. For example, the IO request may include block address twenty for logical volume as a parameter within the IO request. Additionally, relocation entry 412 may include data which associates relocation entry 412 specifically with block address twenty of logical volume 210. In like manner, other relocation entries within relocation table 407 may map other IO requests to different block addresses of logical volume 210.

Responsive to identifying relocation entry 412, storage controller 202 is further operable to identify a corresponding portion $B_0$ on temporary storage 404 of snapshot 217. Because relocation entry 412 has an example value of (2,0), the portion of storage corresponding with relocation entry 412 is ID: 2, offset 0, or more specifically, portion $B_0$ within snapshot 217.

Responsive to identifying corresponding portion $B_0$ of storage, storage controller 202 is further operable to respond to the IO request for logical volume 210 by accessing portion $B_0$ on temporary volume 404. Because snapshot 218 is temporally newer than snapshot 217, portion $B_0$ in this example is read-only (i.e., snapshot 217 freezes or captures the state of $B_0$ after snapshot 218 is generated). If, for example, the IO request was a write request for block address twenty, then the new data for block address twenty contained within the write IO request would be written to the current snapshot (i.e., temporary volume 405 of snapshot 218). Thus, each successive snapshot captures changes to logical volume 210 until a subsequent snapshot is generated. Because relocation entry 412 is utilized to identify and access alternate portions of storage in temporary volumes different than snapshot 218, fewer IO operations are generated when identifying and accessing data within snapshots. In the prior art example of FIG. 1, relocation entries 116, 114, and 112 were processed sequentially to identify portion $A_0$ on temporary volume 105. Thus, the snapshot mechanisms disclosed herein provide for improved performance for system 200 by reducing the number of relocation tables processed to identify data within a plurality of snapshots.

When each new snapshot is generated, a temporary volume of storage may be allocated on one or more storage devices 212-214. Additionally, relocation tables associated with the temporary volume of storage are created. In some cases, relocation entries are generated with initial values. In other cases, relocation entries in temporally earlier snapshots may be copied into the created relocation tables. For example, when snapshot 218 is created as illustrated in FIG. 4, entries in relocation table 406 may be copied to the newly generated relocation table 407 as a matter of design choice, such as copying relocation entry 410 within snapshot 217 to relocation entry 412 of snapshot 218. Additionally, relocation entries may be copied from temporally earlier snapshots responsive to accessing an invalid or initialized relocation entry. For example, if storage controller 202 of virtualization module 220 identified relocation entry 424 as invalid or containing an non-initialized value, storage controller 202 of virtualization module 220 may copy a valid relocation entry 416 from a temporally earlier snapshot (i.e., snapshot 217) to relocation entry 424 after identifying that snapshot 217 contains the valid relocation entry desired. In some cases, relocation entries per se may include information about whether the entry is valid or invalid. In other cases, metadata bit tables may be generated and utilized to store such information about relocation tables.

FIG. 4 additionally illustrates bit tables 206. Bit tables 206 may reside within memory 204 of controller 202, or within a memory of virtualization module 220 illustrated in FIGS. 2B-2C. Typically, bit tables 206 would be metadata generated from relocation tables 406-407. For example, bit table 409 includes a plurality of entries, each entry associated with one or more relocation entries of relocation table 407. Each bit entry in bit table 409 indicates whether a corresponding relocation entry is valid or invalid. In this example, bit entry 418 is a binary 1, which indicates that corresponding relocation entry 412 is valid. Conversely, bit entry 420 is a binary 0, which indicates that relocation entry 424 is invalid. One skilled in the art will recognize that any type of metadata may be generated for bit tables 408-409, and that the example values and mappings provided are for illustrative purposes only. For example, bit entry 418 may correspond to two or more relocation entries in relocation table 407.

A number of IO operations can be eliminated when storage controller 202 of virtualization module 220 utilizes bit tables to identify valid or invalid relocation entries in a corresponding plurality of relocation tables. Consider, for example, that snapshot 218 is the current snapshot of some thousand of snapshots for logical volume 210. In this example, snapshot 217 would be the first, or temporally, the earliest snapshot within logical volume 210. If an IO request was received by storage controller 202, the temporally newer snapshot (i.e., snapshot 218) may first be analyzed to determine if a relocation entry identified in the IO request contained valid data. For example, if the IO request was processed to first identify relocation entry 424 of snapshot 218 and the relocation entry was invalid (e.g., ?,? in this example), then potentially a large number of relocation tables may have to be processed before identifying relocation entry 416 in the earliest snapshot 217. Arguably, storage controller 202 may only be performing this operation once, because after identifying relocation entry 416 as being valid, relocation entry 416 may be copied to current snapshot 218. Be that as it may, additional performance benefits can be gained by utilizing bit tables 206 to identify whether corresponding relocation entries are valid or invalid. Because bit tables 206 may be stored in memory 204 of controller 202 or within a memory of virtualization module 220 illustrated in FIGS. 2B-2C, accessing bit tables 206 may be performed many times faster than accessing relocation tables 406-407, which may be stored persistently on slower storage devices 212-214.

Storage controller 202 may utilize bit tables 206 for improved performance by first identifying bit entries in bit tables corresponding to IO requests. For example, for the IO request corresponding to relocation entry 424 above, bit entry 420 of bit table 409 may be read to identify that relocation entry 424 is invalid. Storage controller 202 of virtualization module 220 may, in response to determining that bit entry 420 is invalid, process each of the plurality of bit tables 408-409 to identify a bit entry which corresponds to the IO request and is valid. For example, in a similar manner to processing an IO request to identify a relocation entry in a relocation table, storage controller may additionally process the IO request to identify a bit entry in a bit table. In cases where bit entries indicated invalid underlying relocation data, alternate bit tables may be processed to identify a valid relocation entry. For example, bit entry 422 within bit table 408 may indicate that relocation entry 416 is valid, thus, storage controller 202 of virtualization module 220 may skip processing relocation tables directly and instead may locate and identify snapshot 217 as containing the desired data. This type of bit table processing by storage controller 202 of virtualization module 220 allows for additional performance improvements within system 200.

When bit tables 206 are utilized to improve the performance of system 200, bit tables may include similar features utilized when updating and maintaining relocation tables 406-407 disclosed previously, such as copying temporally earlier bit tables to temporally newer bit tables, generating bit tables when system 200 starts by reading and processing relocation tables 406-407, or other methods as a matter of design choice. One skilled in the art will recognize that a wide variety of methods exist for generating metadata from relocation tables 406-407 and creating bit tables 408-409.

In some cases, a snapshot may be marked for deletion. When a snapshot is marked for deletion, entries in a temporally earlier snapshot are merged with corresponding entries of the snapshot marked for deletion. For example, snapshot 218 of FIG. 4 may be marked for deletion. Before relocation table 407 is deleted, entries within relocation table 407 which have changed within snapshot 218 are merged with entries within relocation table 406. For example, relocation table 407 includes an entry value of (4,2) which points to location $A_1$ in temporary volume 405. Because this entry value has changed within snapshot 218, this entry value will be merged with a corresponding entry position in relocation table 406. Entries which have not changed within relocation table 407 will not be merged with entries in relocation table 406. For example, because entry 414 has not changed within snapshot 218, entry 414 will not be merged with entry 424 within snapshot 217.

Although various examples of snapshot processing using virtualization module 220 have been illustrated with respect to storage controller 202 of FIG. 2A for improving the performance of system 200, one skilled in the art will recognize that virtualization module 220 may also be embodied within a network appliance 226 of FIG. 2B. In this embodiment, virtualization module 220 of FIG. 2B performs the functionality described previously with respect to storage controller 202 of FIG. 2A. In like manner, virtualization module 220 may be embodied within host system 222 as illustrated in FIG. 2C.

FIGS. 5-8 are flowcharts illustrating exemplary methods in accordance with features and aspects disclosed herein. The methods illustrated in FIGS. 5-8 may be tangibly embodied on a computer readable medium as programmed instructions, which, when executed by IO processor 208 of storage controller 202, are operable for performing the steps illustrated in methods of FIGS. 5-8. Additionally, one skilled in the art will recognize that the various steps illustrated in FIGS. 5-8 may include fewer or more steps as a matter of design choice.

Figure 5:
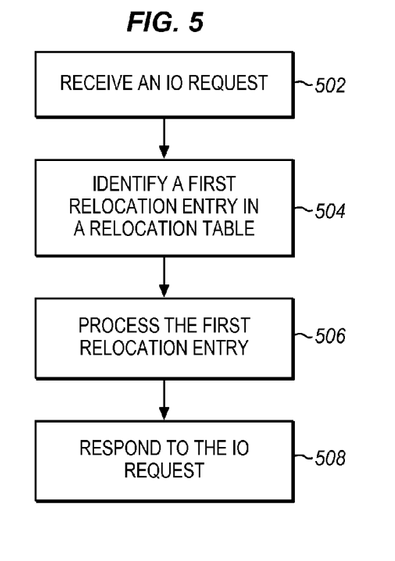
FIGS. 5-8 are flowcharts illustrating exemplary methods to reduce the IO operations when locating data within snapshots in accordance with features and aspects disclosed herein.

FIG. 5 is a flow chart illustrating an exemplary method in accordance with features and aspects herein operable on a storage controller such as storage controller 202 of FIG. 2.

Step 502 of the method of FIG. 5 comprises receiving an IO request for a logical volume. The IO request may include read request for data stored on the logical volume, or write requests to modify data on the logical volume. Additionally, the IO requests may be internal to a storage controller or externally generated by a host computer coupled with a storage system which includes the storage controller.

Step 504 comprises identifying a first relocation entry in a relocation table based on the IO request. For example, relocation entry 412 of FIG. 4 may be identified based on the IO request. In a manner similar to that discussed with respect to system 200 of FIG. 2, the IO request may be processed in a number of ways to identify relocation entry 412.

Step 506 comprises processing the first relocation entry to identify the corresponding portion of storage on a temporary volume. For example, relocation entry 412 may be processed to identify portion $B_0$ on temporary volume 404 of FIG. 4.

Step 508 comprises responding to the IO request for the logical volume by accessing the identified portion of storage on the temporary volume. For example, portion $B_0$ on temporary volume 404 of FIG. 4 may be accessed to respond to the IO request.

Figure 6:
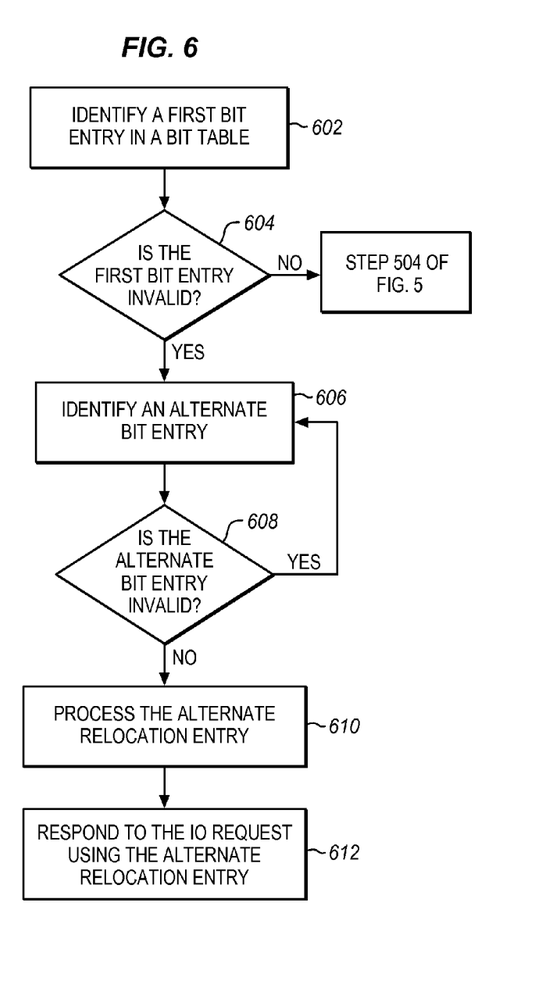

FIG. 6 is a flow chart illustrating an exemplary method in accordance with features and aspects herein operable on a storage controller such as storage controller 202 of FIG. 2.

Step 602 of the method of FIG. 6 comprises identifying a first bit entry in a bit table based on an IO request. For example, bit entry 420 of bit table 409 in FIG. 4. In a manner similar to that discussed with respect to system 200 of FIG. 2, the request may be processed in a number of ways to identify bit entry 420.

Step 604 comprises determining if the bit entry indicates if the corresponding relocation entry is invalid or valid. For example, bit entry 420 of FIG. 4 indicates that relocation entry 424 within snapshot 218 is invalid. Responsive to determining that the bit entry is invalid, step 606 is performed. Conversely, responsive to determining that the bit entry is valid, step 504 of the method of FIG. 5 is performed.

Step 606 comprises identifying an alternate bit entry in a bit table of an alternate snapshot. For example, bit tables 206 may be processed to identify bit entries corresponding to bit entry 420.

Step 608 comprises determining if the alternate bit entry identified in step 606 is invalid or valid. For example, bit entry 422 of bit table 408 corresponds with bit entry 420 of bit table 409. Additionally, bit entry 422 is valid. Responsive to determining that the bit entry is valid, step 610 is performed. Conversely, responsive to determining that the bit entry is invalid, step 606 is performed to identify another alternate bit entry.

Step 610 comprises processing the alternate relocation entry to identify a corresponding portion of storage on a temporary volume. For example, relocation entry 416 may be processed to identify portion $C_N$ on storage 402. Additionally, valid relocation entry 416 may be copied to invalid relocation entry 424 position, and bit entry 420 may be marked as valid. By copying the identified valid relocation entry (i.e., relocation entry 416) to the corresponding relocation entry 424 of the current snapshot, subsequent IO requests for portion $C_N$ on storage 402 can be processed within relocation table 407 of the current snapshot, thus reducing IO processing of bit tables 206 and relocation table 406.

Step 612 comprises responding to the IO request by accessing the portion of storage indicated by the alternate relocation entry. For example, portion $C_N$ on storage 402 may be accessed to respond to the IO request.

Figure 7:
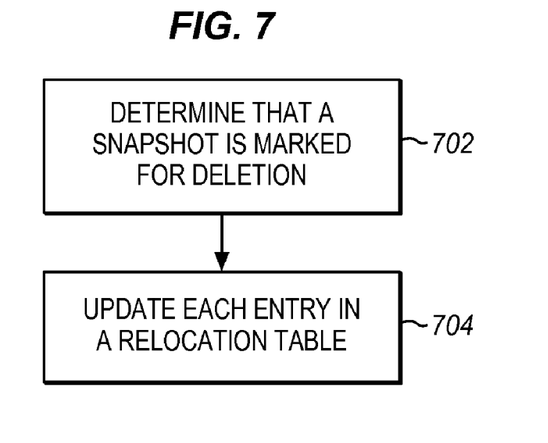

FIG. 7 is a flow chart illustrating an exemplary method in accordance with features and aspects herein operable on a storage controller such as storage controller 202 of FIG. 2.

Step 702 comprises determining that a snapshot is marked for deletion. For example, snapshot 217 of FIG. 4 may be marked for deletion.

Step 704 comprises updating each entry in a temporally older snapshot (e.g., snapshot 217) by merging each corresponding entry of the snapshot marked for deletion. For example, relocation entry 412 may be merged with relocation entry 410. Correspondingly, relocation entry 424 of snapshot 218 may be merged with the corresponding relocation entry 416 of snapshot 217.

Figure 8:
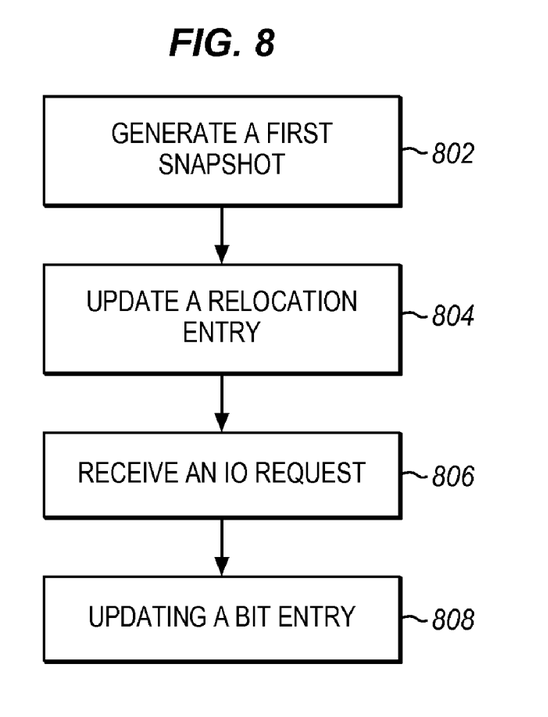

FIG. 8 is a flow chart illustrating an exemplary method in accordance with features and aspects herein operable on a storage controller such as storage controller 202 of FIG. 2.

Step 802 comprises generating a first snapshot of a logical volume. For example, snapshot 218 of FIG. 4 may be generated. Snapshot 218 would be the newest snapshot of a sequence of snapshots for logical volume 210. When generating the first snapshot, a temporary volume and a relocation table are generated. Additionally, a bit table associated with the relocation table may be generated. For example, temporary volume 405 may be allocated on one or more storage devices 212-214 of FIG. 2. Additionally, relocation table 407 may be generated and filled with initial values. In some cases, relocation entries of a temporally earlier snapshot (e.g., snapshot 217) may be copied into relocation table 407. When the bit table is generated, it may be filled with initial values indicating that the corresponding relocation entries are invalid, or, in the case where relocation entries in a temporally earlier snapshot are copied to the new snapshot, the new relocation table may be processed to generate the corresponding valid or invalid entries in the new bit table. The newly generated bit table may be stored in a memory of a controller, such as memory 204 of controller 202.

Step 804 comprises updating a relocation entry within a relocation table of the newly generated snapshot, where the relocation entry is associated with a portion of storage on a temporally earlier snapshot. For example, relocation entry 412 within snapshot 218 may be updated with the values stored in relocation entry 410 of snapshot 217. In this example, relocation entry 412 corresponds to portion B0 on snapshot 217.

Step 806 comprises receiving an IO request. The IO request may be similar to IO requests received and discussed above for system 200 and the methods of FIGS. 5-7. Subsequent to receiving the IO request, step 806 may include identifying the relocation entry, processing the relocation entry, and responding to the request in a manner similar to that of system 200 and the methods of FIGS. 5-7 discussed above.

Step 808 comprises updating a bit entry in a bit table. For example, responsive to generating the first snapshot, bit entries in a bit table associated with the first snapshot may be updated. When the relocation table is generated and the relocation entries are set to invalid, then the corresponding bit entries in the bit table may also be set to invalid. Conversely, if one or more relocation entries are copied from a temporally earlier snapshot, the newly generated relocation table may be processed to identify if a corresponding bit entry in the newly generated bit table should be set to invalid or valid.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable in a computing device associated with a storage system for processing Input/Output (IO) requests for a logical volume comprising a root volume and a plurality of temporally sequential snapshots, each snapshot including a relocation table and a corresponding temporary volume, each relocation table including a relocation entry associated with a corresponding portion of storage on a temporary volume, the method comprising:
    receiving an IO request for the logical volume;
    identifying a first relocation entry in a relocation table of a first snapshot based on the IO request, wherein the first relocation entry is associated with a portion of storage on a temporary volume of a second snapshot, and wherein the second snapshot is temporally older than the first snapshot;
    processing the first relocation entry to identify the corresponding portion of storage on the temporary volume of the second snapshot; and
    responding to the IO request for the logical volume by accessing the identified portion of storage on the temporary volume of the second snapshot.

2. The method of claim 1 wherein a snapshot further includes a bit table associated with a relocation table, the bit table including a bit entry associated with a corresponding relocation entry in the relocation table, the bit entry indicating if a corresponding relocation entry is valid or invalid, the method further comprising:
    identifying a first bit entry in a bit table of the first snapshot based on the IO request, wherein the first bit entry is associated with the first relocation entry;
    responsive to determining that the first bit entry indicates that the first relocation entry is invalid, performing the additional steps of:
        identifying an alternate bit entry in a bit table of an alternate snapshot based on the IO request, wherein the alternate bit entry indicates that an alternate relocation entry in a relocation table of the alternate snapshot is valid; and
    wherein the step of processing the first relocation entry further comprises:
        processing the alternate relocation entry to identify a corresponding portion of storage on a temporary volume of the alternate snapshot.

3. The method of claim 2 the step of performing additional steps further comprises:
    updating the first relocation entry using the alternate relocation entry; and
    updating the first bit entry to indicate that the first relocation entry is valid.

4. The method of claim 3 wherein:
    receiving the IO request for the logical volume comprises receiving a write request for the logical volume; and
    updating the first relocation entry and the first bit entry is performed in response to receiving the write request.

5. The method of claim 1 further comprising:
    determining that the first snapshot is marked for deletion; and
    updating each entry in the relocation table of the second snapshot by merging each entry in the relocation table of the first snapshot with a corresponding relocation entry in the relocation table of the second snapshot.

6. The method of claim 1:
    wherein the step of processing the first relocation entry further comprises:
        determining that the first relocation entry identifies a portion of storage associated with a snapshot that has been deleted; and
        identifying an alternate portion of storage on a temporary volume associated with an alternate snapshot that is temporally earlier than the first snapshot;
    wherein the step of responding to the IO request for the logical volume further comprises:
        responding to the IO request for the logical volume by accessing the alternate portion of storage.

7. A system comprising:
    a storage device including a logical volume the logical volume comprising a root volume and a plurality of temporally sequential snapshots associated with the storage device, wherein each snapshot includes a temporary volume of storage and a relocation table, wherein each relocation table includes a relocation entry associated with a corresponding portion of storage on a temporary volume; and a computing device coupled with the storage device, the computing device operable to receive an Input/Output (IO) request for the logical volume, wherein the computing device is further operable to process the IO request to identify a first relocation entry in a relocation table of a first snapshot, wherein the first relocation entry is associated with a portion of storage on a temporary volume of a second snapshot, and wherein the second snapshot is temporally older than the first snapshot, wherein the computing device is further operable to process the first relocation entry to identify the corresponding portion of storage on the temporary volume of the second snapshot, and wherein the computing device is further operable to respond to the IO request for the logical volume by accessing the identified portion of storage on the temporary volume associated with the second snapshot.

8. The system of claim 7 further comprising:

a memory coupled with the computing device, wherein the memory includes a plurality of bit tables, wherein each of the plurality of bit tables is associated with a corresponding relocation table of the plurality of relocation tables, wherein each bit table includes a bit entry associated with a corresponding relocation entry in a corresponding relocation table, and wherein a bit entry identifies if the relocation entry in the corresponding relocation table is valid or invalid;

wherein the computing device is further operable to identify a first bit entry in a bit table of the first snapshot based on the IO request, wherein the first bit entry is associated with the first relocation entry, wherein the computing device, responsive to determining that the first bit entry indicates that the first relocation entry is invalid, is further operable to:

identify an alternate bit entry in a bit table of an alternate snapshot of the plurality of snapshots based on the IO request, wherein the alternate bit entry indicates that an alternate relocation entry in a relocation table of the alternate snapshot is valid, and process the alternate relocation entry to identify a corresponding portion of storage on a temporary volume of the alternate snapshot.

9. The system of claim 8:

wherein the computing device, responsive to determining that the first relocation entry is invalid, is further operable to:

update the first relocation entry using the alternate relocation entry, and update the first bit entry to indicate that the first relocation entry is valid.

10. The system of claim 9:

wherein the computing device, responsive to the IO request for the logical volume comprising a write request, is further operable to update the first relocation entry and the first bit entry.

11. The system of claim 7:

wherein the computing device is further operable to determine that the first snapshot is marked for deletion, and wherein the computing device is further operable to update each entry in the relocation table of the second snapshot by merging each entry in the relocation table of the first snapshot with a corresponding relocation entry in the relocation table of the second snapshot.

12. The system of claim 7:

wherein the computing device is further operable to determine that the first relocation entry identifies a portion of storage on a temporary volume associated with a snapshot that has been deleted, wherein the computing device is further operable to identify an alternate portion of storage on a temporary volume associated with an alternate snapshot which is temporally earlier than the first snapshot, and wherein the computing device is further operable to respond to the IO request for the logical volume by accessing the alternate portion of storage.

13. A method operable in a computing device associated with a storage system for managing a snapshot for a logical volume, the logical volume comprising a root volume and a plurality of temporally sequential snapshots, each snapshot including a relocation table and a corresponding temporary volume, the relocation table including a relocation entry associated with a corresponding portion of storage on a temporary volume, the method comprising:

generating a first snapshot of the logical volume; and updating a relocation entry within a relocation table of the first snapshot, wherein the relocation entry is associated with a portion of storage on a temporary volume of a second snapshot, and wherein the first snapshot is temporally newer than the second snapshot.

14. The method of claim 13 further comprising:

receiving an Input/Output (IO) request;

identifying the relocation entry in the first snapshot based on the IO request;

processing the relocation entry in the first snapshot to identify the portion of storage on the temporary volume of the second snapshot; and responding to the IO request by accessing the portion of storage on the second snapshot.

15. The method of claim 14 wherein the step of updating the relocation entry further comprises:

identifying a relocation entry in a relocation table of the second snapshot corresponding to the relocation entry in the first snapshot; and copying the relocation entry in the second snapshot to the relocation entry in the first snapshot.

16. The method of claim 14 wherein a snapshot further includes a bit table associated with a relocation table, the bit table including a bit entry associated with a corresponding relocation entry in the relocation table, the bit entry indicating if a corresponding relocation entry is valid or invalid, the method further comprising:

updating a bit entry within a bit table of the first snapshot, wherein the bit entry is associated with the relocation entry in the first snapshot, and wherein the bit entry indicates that the relocation entry in the first snapshot is valid.

17. The method of claim 16 wherein identifying the relocation entry in the first snapshot further comprises:

processing one or more bit tables to determine if the bit entry of the first snapshot is valid or invalid; and identifying the relocation entry in the first snapshot responsive to determining that the bit entry of the first snapshot is valid.

18. The method of claim 13 wherein the step of updating the relocation entry further comprises:

updating the relocation entry of the first snapshot responsive to generating the first snapshot by copying each relocation entry in a relocation table of the second snapshot to a corresponding relocation entry in the first snapshot.

19. The method of claim 18 further comprising:
determining that the first snapshot is marked for deletion; and
updating the relocation table in the second snapshot by merging each relocation entry in the first snapshot with a corresponding relocation entry in the second snapshot.

20. The method of claim 18 further comprising:
determining that the relocation entry in the first snapshot identifies a portion of storage that has been deleted;
identifying an alternate portion of storage on a snapshot which is temporally earlier than the first snapshot; and
responding to the IO request for the logical volume by accessing the alternate portion of storage.

* * * * *